United States Patent [19]

Johnson

[11] Patent Number: 5,198,734

[45] Date of Patent: Mar. 30, 1993

[54] METHOD AND MEANS FOR STOPPING BACKSPINNING MOTOR

[75] Inventor: Archie C. Johnson, Cody, Wyo.

[73] Assignee: Marathon Oil Company, Findlay, Ohio

[21] Appl. No.: 848,624

[22] Filed: Mar. 9, 1992

[51] Int. Cl.⁵ .............................................. H02P 3/00
[52] U.S. Cl. ...................................... 318/369; 318/275
[58] Field of Search ............... 318/362, 364, 365, 368, 318/369, 284, 285, 286, 290, 291, 256, 261, 264, 273, 275, 375, 377, 799

[56] References Cited

U.S. PATENT DOCUMENTS

| | | | |
|---|---|---|---|
| 3,584,281 | 6/1971 | Reever et al. | 318/284 X |
| 3,633,082 | 1/1972 | Hasegawa et al. | 318/212 |
| 3,735,224 | 5/1973 | Bachofer et al. | 318/284 |
| 3,798,523 | 3/1974 | Gross | 318/212 |
| 4,195,255 | 3/1980 | Guttmann | 318/762 |
| 4,395,670 | 7/1983 | Podell | 318/758 |
| 4,410,845 | 10/1983 | Lockyear | 318/459 |
| 4,496,888 | 1/1985 | Campbell | 318/291 X |
| 4,514,670 | 4/1985 | Fassel et al. | 318/266 X |
| 4,628,232 | 12/1986 | Saganovsky et al. | 318/284 |
| 4,857,818 | 8/1989 | Hobbs | 318/762 |
| 4,990,844 | 2/1991 | Gritter et al. | 318/362 X |

Primary Examiner—Jonathan Wysocki
Attorney, Agent, or Firm—Jack L. Hummel; Jack E. Ebel

[57] ABSTRACT

A method for stopping the backspinning of a submersible pump motor prior to restarting the motor. A control circuit is provided which rectifies A.C. control voltage and applies the resulting D.C. voltage to an induction motor. This sets up a stationary magnetic field in the stator of the motor which creates a braking effect on the rotor. By braking the backspinning to a stop or to a speed which will not harm the motor if restarted while still backspinning, the motor can be restarted without having to wait until the downward flow of fluid causing the backspinning stops.

5 Claims, 2 Drawing Sheets

METHOD AND MEANS FOR STOPPING BACKSPINNING MOTOR

FIELD OF THE INVENTION

This invention relates to a method and means for preventing a motor from starting while it is backspinning. More particularly, it relates to a method and means for stopping a backspinning motor prior to starting it.

BACKGROUND OF THE INVENTION

One method of producing oil from a subterranean reservoir is through the use of submersible pumps located in deep wells. Such pumps typically are powered by alternating current (A.C.) motors, which are often automatically stopped for a variety of reasons, such as momentary overloads due to power fluctuations and well shut-downs occurring as a result of pressure variations or equipment problems. When this happens the momentum of the spinning motor causes it to continue to spin in a forward direction for a brief period of time. Thereafter the liquid in the casing above the pump begins to flow back down into the well, turning the vanes of the pump in the reverse direction, thereby causing the motor to rotate in a counter direction. Depending upon the height of the liquid column, which often may be as much as several thousand feet above the pump, the motor may continue to backspin for quite a long period of time, as long as an hour in some cases. By waiting for the backspinning to stop before starting the pumping operation once more, valuable production time is lost. The alternative of starting the pump motor before backspinning terminates is too risky, however, in view of the possibility that this could cause the motor or pump shaft to twist off due to excessive torque or could burn out the motor as a result of the extra time that locked motor amperage will be applied.

In addition to recommending against premature starting of a backspinning motor, pump manufacturers have attempted to solve the problem by incorporating delay timers into the circuitry of the unit to prevent restarting of the motor for a period of time calculated to allow the backspinning to cease. Since all situations cannot be foreseen, the time delay selected can be quite a bit longer than is actually necessary or, in some cases, less than that actually required. Another preventive measure has been to incorporate backspin detection systems in the pump unit to prevent restarting as long as the motor continues to backspin. While this in theory prevents the motor from being harmed due to premature starting, it does nothing to alleviate the long production delays resulting from the backspinning phenomenon. Moreover, such measures have not proven reliable in practice. The use of downhole or surface check valves to prevent downward flow of the column of liquid in the production tubing has also been employed, but this too is unreliable due to leaking and plugging of the check valves, which allows the downward passage of fluid to cause backspinning of the motor to occur.

In view of the problems outlined above, it would be highly desirable to be able to not only prevent premature starting of a submersible pump motor, but also to reduce the duration of the backspinning of the motor. It is therefore a primary object of the invention to provide a means for stopping the backspinning of a motor prior to restarting it.

BRIEF SUMMARY OF THE INVENTION

In accordance with the invention, direct current (D.C.) voltage is applied to a shut-down A.C. motor, the rotor of which is backspinning, to brake the backspinning rotation of the rotor. The braking voltage is supplied until the rotor has stopped or the speed of the backspinning rotation has been reduced to a level which is not harmful to the motor if restarted. Application of the braking D.C. voltage is then ceased and A.C. operating voltage is supplied to start the motor.

The invention has special utility in connection with a submersible rotary pump located in a deep well, such as may be found in the production of hydrocarbon fluids from a subterranean reservoir. As indicated above, when the motor powering such a pump stops, the pump is rotated in a direction counter to its normal operating direction by downward flow of fluid which had been pumped prior to shut-down of the motor, causing the rotor of the pump motor to backspin. By braking the backspinning, the pump motor can be quickly restarted and pumping operations can again be resumed, thereby saving valuable production time which would have been wasted by having to wait for the downward flow of fluid to come to a halt of its own accord. Typically, a submersible pump motor is a three-phase induction motor, and D.C. current is supplied to two of the phases in order to brake the backspinning rotation.

In carrying out the invention, a control circuit is employed in which rectifying means are incorporated to produce D.C. voltage from A.C. voltage. Time delay means are provided for controlling the length of time that the A.C. voltage is delivered to the rectifier, which correspondingly controls the length of time that the D.C. braking voltage is applied to the motor. Further, control relay means are provided through which the A.C. control voltage is directed to the time delay means.

Means are also provided for preventing application of A.C. operating voltage to the motor during application of D.C. voltage. In addition, the application of A.C. operating voltage to the motor is delayed for a short period of time after ceasing application of D.C. voltage to the motor in order to allow the D.C. field in the motor to collapse.

The control means for restarting a backspinning motor, which may be actuated by a manual switch or a timer, is inexpensive and reliable, and capable of saving a great deal of otherwise lost cumulative production time.

The above and other features and aspects of the invention, as well as other benefits, will readily be ascertained from the following more detailed description of the preferred embodiment.

DETAILED DESCRIPTION OF THE PREFERRED EMBODIMENT

Figure 1:
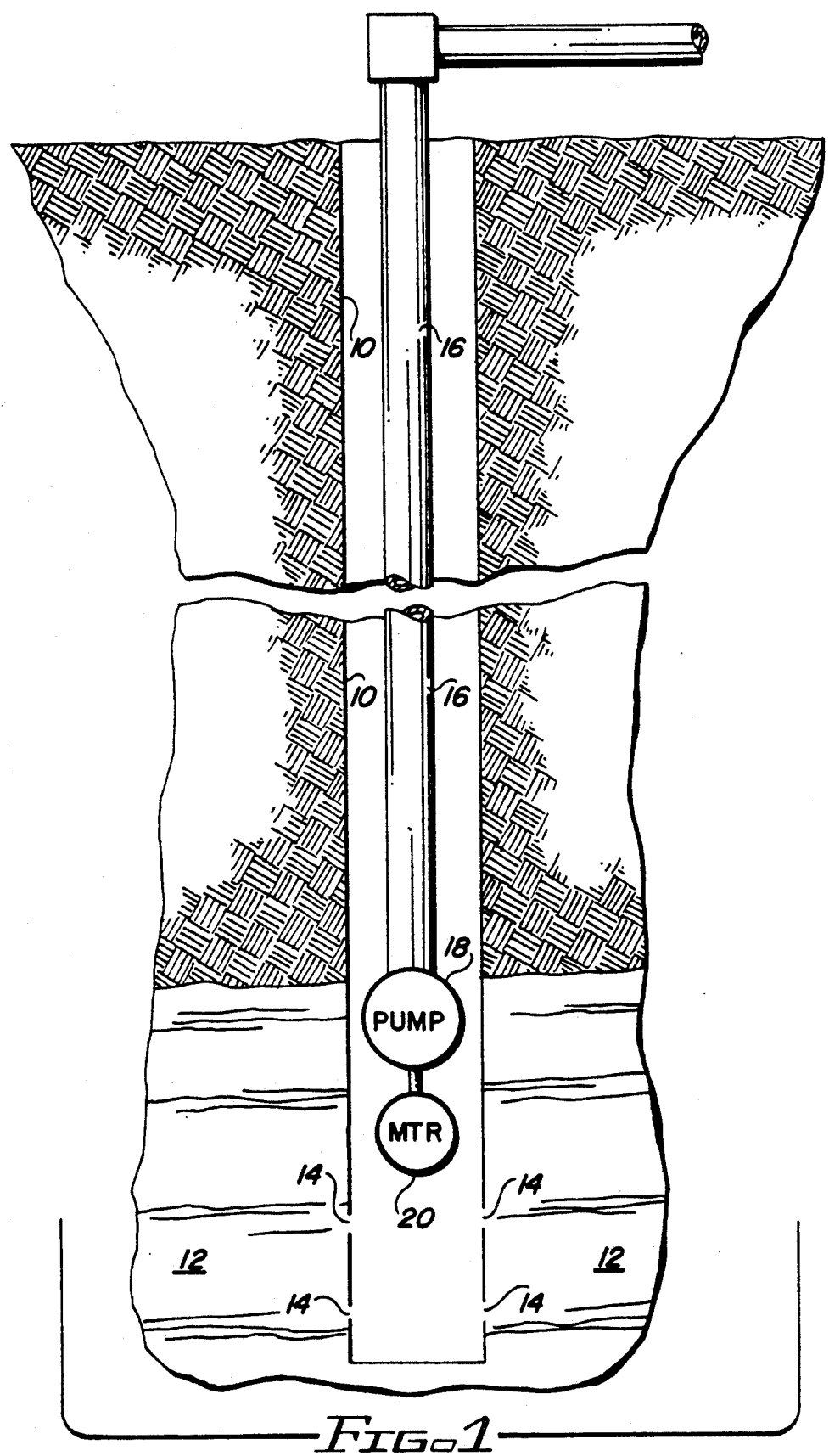
FIG. 1 is a simplified longitudinal sectional view of a deep oil well in which a submersible pump powered by a motor controlled by the present invention is located.

Referring to FIG. 1, the wellbore 10 of a deep well extends down to an oil bearing formation 12. Reservoir fluid flows from the formation through apertures 14 in the wellbore and is lifted up to the surface through the production string 16 by means of centrifugal pump 18. The centrifugal pump is powered by motor 20. As can be appreciated, if the motor is stopped for any reason, the column of reservoir fluid in the production tubing 16 above the pump will flow back down to the well, causing the pump vanes to turn in a direction counter to their normal pumping direction, which in turn causes the motor to backspin. Rather than simply delay starting of the motor again until the entire column of liquid has fallen back down past the pump and backspinning has ended by natural means, the invention provides for stopping the backspinning and then restarting the motor while there is still a column of liquid above the pump.

Figure 2:
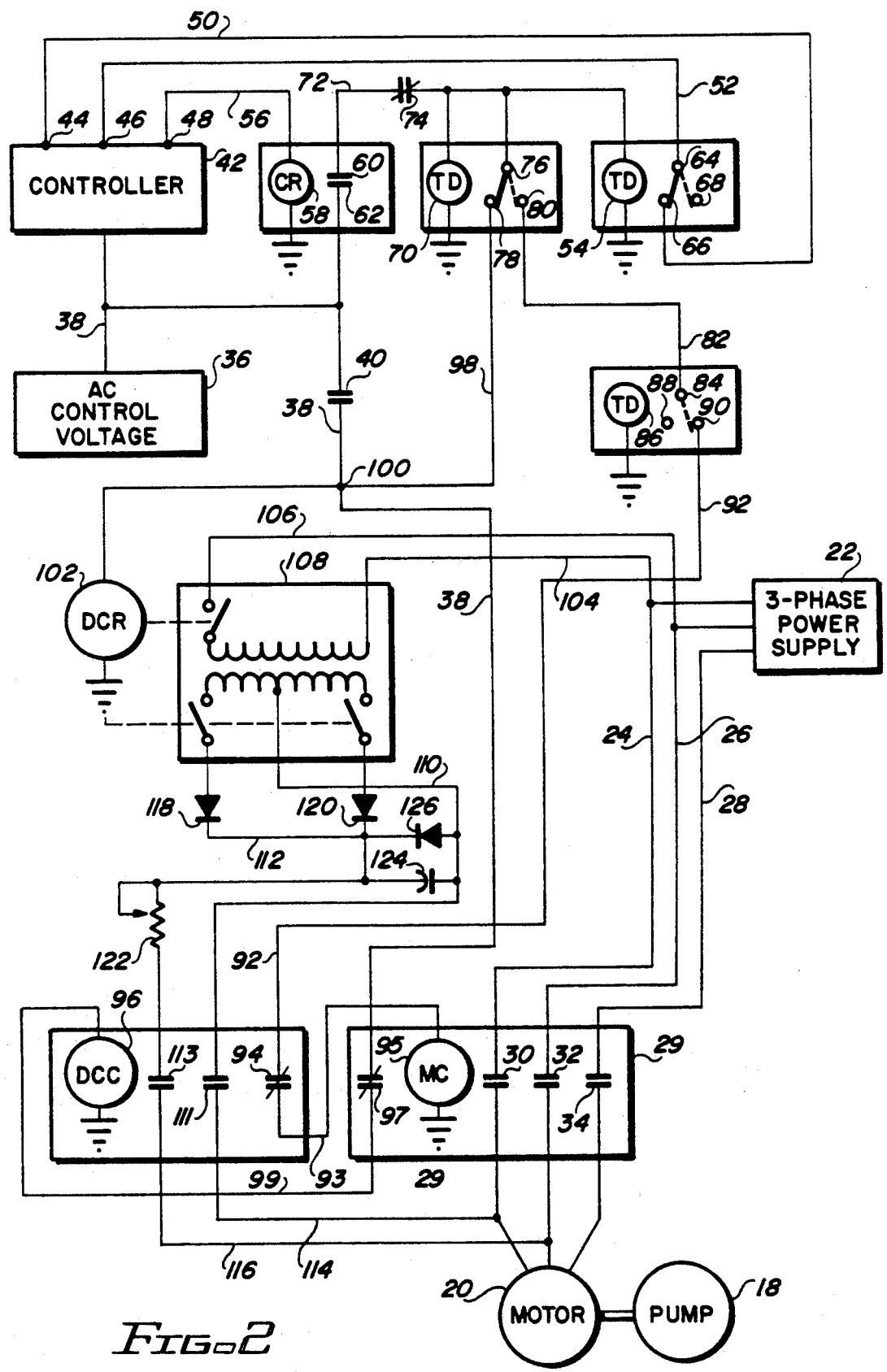
FIG. 2 is an electrical schematic illustrating the motor stopping and restarting circuit of the invention.

Referring now to FIG. 2, an electrical circuit for carrying out the invention is illustrated. The pump motor 20 is connected to a three-phase power supply 22 through electrical lines 24, 26 and 28 leading to the main contactor 29 in which contacts 30, 32 and 34 are connected. AC current flows from a 120 volt control voltage source 36 into the circuit through line 38 in which a manual on/off switch 40 is located. The line 38 is also connected to a controller, indicated by block 42. The controller 42, which includes terminals 44, 46 and 48, may be of any suitable type capable of delivering control voltage to the relay and time delay described below, such as for example, Kratos Motor Controller. Electrical lines 50 and 52 extend from terminals 44 and 46, respectively, to a time delay 54, and line 56 extends from terminal 48 to control relay 58. The control relay contains normally open contacts 60 and 62, while the time delay 54 contains contacts 64, 66 and 68, with the line 52 being connected to the contact 64 and the line 50 being connected to the contact 66.

Another time delay 70 is connected to the contact 60 of control relay 58 by means of line 72 in which a disabling toggle 74 is connected. The time delay 70 contains contact 76, to which line 72 is connected, and also contacts 78 and 80. Line 82 connects contact 80 of time delay 70 to contact 84 of time delay 86. Time delay 86 also contains contacts 88 and 90, with contact 88 being connected by line 92 to auxiliary relay 94 of DC contactor 96. Line 93 connects the auxiliary relay 94 to the closing coil 95 of the main contactor 29. The main contactor also includes auxiliary relay 97 to which the line 38 is connected and from which line 99 extends to the D.C. connector 96.

Line 98 connects contact 78 of time delay 70 to line 38 by means of terminal 100 and to the direct current rectifier 102. Lines 104 and 106 connect the primary winding of the step-down transformer 108 of the rectifier to the lines 24 and 26 of the 3-phase power supply, and lines 110 and 112 connect the secondary winding of the transformer to contacts 111 and 113 in the D.C. contactor. Direct current passes from the D.C. contactor through lines 114 and 116 to the lines 24 and 26 leading to the motor 20. This direct current braking power is derived by full wave rectifying the secondary voltage of the step-down transformer by means of rectifier diodes 118 and 120. The current magnitude is controlled by the braking current adjuster adjustment resistor 122. The filter capacitor 124 smooths out the rectified voltage and, with the inductive drain diode 126, reduces the back voltage caused by the collapsing D.C. field when the direct current contactor is opened.

In operation, assume that the pump motor 20 has been shut off for any of the many reasons for which such action typically often occurs, and that it is desired to restart the motor to resume pumping operations before the column of liquid above the pump 18 has all drained down. Under these conditions the downwardly flowing liquid causes the pump vanes to rotate in a direction opposite to their normal pumping direction, causing the rotor of the motor 20 to backspin. While this is occurring direct current is applied to the motor to act as a brake to the spinning of the rotor.

Under typical conditions this will be initiated by the timing out of a restart timer which energizes terminal 48 of controller 42, thereby closing contacts 60–62 of control relay 58. This applies 120 volt control voltage to time delay 54 and time delay 70, closing contacts 64–66 of time delay 54 and contacts 76–78 of time delay 70. Control voltage is thus sent from time delay 70 through line 98 to the direct current rectifier 102, and direct current is sent from the rectifier to the D.C. contactor 96 through lines 110 and 112 and on to the motor through lines 114 and 116. The application of D.C. voltage to two phases of the three-phase induction motor 20 sets up a stationary magnetic field in the stator of the motor, creating a braking effect on the rotor. The length of time that the direct current braking power is applied to the motor is controlled by the time setting of the time delay 70.

When the time delay 70 times out, contacts 76–78 open and contacts 76–80 close, energizing time delay 86, resulting in the opening of the contacts 84–90 of time delay 86. The time setting of time delay 86 is set for a very short period, such as 0.1 second to 1.0 second, to allow the D.C. field in the motor to collapse. When the time delay 86 times out, its contacts 84–90 close, thereby energizing the main contactor 95, which starts the motor on the voltage from the source 22. The current path for the closing coil of the main contactor is from the terminal 90 of time delay 86 through the auxiliary relay 94 of the D.C. contactor 96, which provides an interlock that prevents both the D.C. contactor 96 and the main contactor 95 from being closed at the same time.

Time delay 54, which is initially energized from the lines 50 and 52 extending from contacts 44 and 46 of controller 42, is set to time out shortly after the sum of the time settings of time delays 58 and 86 has expired. The purpose of the time delay 54, when energized, is to block the underload shut-down of the controller 42.

It will be understood that control voltage may also be applied to the rectifier through the manual start switch 40 if it is desired to bypass the restart timer for any reason.

The length of time that braking current is supplied to the motor may vary, but the setting should be enough to brake the backspinning to a complete stop or at least to slow it to a speed that can readily be overcome by the start-up of the motor without damaging the motor, the pump protector or the pump shaft. It is not feasible to state what such a time period must be, since it will vary with operating conditions and with the pump itself. Typically, however, it would be on the order of several seconds. The minimum backspinning speed at which a pump motor can be restarted and the minimum braking period can readily be determined for any particular pump through trials under various operating conditions or from information supplied by the pump manufacturer.

It should be understood that the invention is not necessarily limited to the specific details described in connection with the preferred embodiment, and that changes to certain features and aspects thereof which do not affect the overall basic function and concept of the invention may be made by those skilled in the art without departing from the spirit and scope of the invention, as defined in the appended claims.

What is claimed is:

1. In the operation of a rotary submersible pump in a deep well, wherein the pump is powered by a polyphase A.C. motor which has been shut down during a pumping operation and wherein the rotor of the A.C. motor is backspinning due to counter rotation of the pump caused by downward gravity-induced flow of fluid pumped prior to the motor shut-down, the improvement comprising:

applying D.C. voltage to the motor to brake the backspinning of the rotor until the rotor has stopped or until the speed of the backspinning has been reduced to a level determined not to be harmful to the motor or pump if the motor is restarted;

ceasing the application of D.C. voltage; and applying A.C. operating voltage to the motor to restart the same to continue the pumping operation.

2. The improvement of claim 1, wherein the D.C. voltage is produced by applying A.C. control voltage to rectifying means, and wherein the period of time that the D.C. voltage is applied to the motor is determined by time delay means which controls the length of time that A.C. control voltage is applied to the rectifying means.

3. The improvement of claim 2, including the step of delaying the application of A.C. operating voltage to the motor for a short period of time after ceasing application of D.C. voltage to the motor in order to allow the D.C. field in the motor to collapse.

4. The improvement of claim 1, wherein the A.C. motor is a three-phase induction motor and the D.C. voltage is applied to two phases of the motor.

5. The improvement of claim 1, wherein the submersible pump is pumping reservoir fluid in a hydrocarbon production operation.

* * * * *

UNITED STATES PATENT AND TRADEMARK OFFICE
CERTIFICATE OF CORRECTION

PATENT NO. : 5,198,734
DATED : March 30, 1993
INVENTOR(S) : Archie C. Johnson It is certified that error appears in the above-identified patent and that said Letters Patent is hereby corrected as shown below:

Col. 1, lines 1 and 2: Delete "Method and Means for Stopping Backspinning Motor" and insert --Method of Stopping Backspinning A.C. Pump Motor and Restarting the Same--

Signed and Sealed this

Thirtieth Day of November, 1993

Attest:

BRUCE LEHMAN

*Attesting Officer*  *Commissioner of Patents and Trademarks*